(12) United States Patent
DeMaster

(10) Patent No.: US 9,737,050 B2
(45) Date of Patent: Aug. 22, 2017

(54) MULTI-SIDE DOG WASH AND METHOD OF USE

(71) Applicant: Ella Katherine DeMaster, Farmington, MN (US)

(72) Inventor: Ella Katherine DeMaster, Farmington, MN (US)

( * ) Notice: Subject to any disclaimer, the term of this patent is extended or adjusted under 35 U.S.C. 154(b) by 95 days.

(21) Appl. No.: 14/657,334

(22) Filed: Mar. 13, 2015

(65) Prior Publication Data
US 2015/0257360 A1 Sep. 17, 2015

Related U.S. Application Data

(60) Provisional application No. 61/952,237, filed on Mar. 13, 2014.

(51) Int. Cl.
*A01K 13/00* (2006.01)

(52) U.S. Cl.
CPC .................. *A01K 13/001* (2013.01)

(58) Field of Classification Search
CPC ......... A01K 13/001; A61D 11/00; E06C 1/06; E03C 1/0408; E03C 1/066; A45D 19/04
USPC .......................... 119/651, 669, 600, 671, 665
See application file for complete search history.

(56) References Cited

U.S. PATENT DOCUMENTS

| | | | | |
|---|---|---|---|---|
| 883,132 A * | 3/1908 | Goff | ...................... | A01K 13/003 119/669 |
| 3,023,734 A * | 3/1962 | Schaub | ................ | A01K 1/0613 119/676 |
| 3,421,480 A * | 1/1969 | Cole | ...................... | A01K 13/003 119/669 |
| 3,949,709 A * | 4/1976 | Myers | .................. | A01K 13/003 119/667 |
| 4,020,796 A * | 5/1977 | Grifa | ...................... | A01K 13/001 119/671 |
| 4,056,078 A | 11/1977 | Blafford | | |
| 4,057,032 A | 11/1977 | Dimitriadis | | |
| 4,478,176 A * | 10/1984 | James | .................. | A01K 13/003 119/669 |
| 4,505,229 A * | 3/1985 | Altissimo | ............ | A01K 13/001 119/668 |
| 4,741,289 A * | 5/1988 | Blose | .................. | A01K 13/001 119/671 |
| 4,782,792 A * | 11/1988 | Anthony | .............. | A01K 13/001 119/665 |
| 5,142,713 A * | 9/1992 | Makool | .................. | A61H 33/10 4/525 |
| 5,213,064 A | 5/1993 | Mondine | | |
| 5,561,869 A * | 10/1996 | Sarel | ...................... | A47K 7/046 4/606 |
| 6,688,257 B2 | 2/2004 | Lee | | |
| 6,749,238 B2 * | 6/2004 | Hoyt | ...................... | B65G 47/91 294/183 |
| 6,851,623 B1 * | 2/2005 | Watterworth | ......... | B05B 7/1495 239/10 |
| 7,389,747 B2 | 6/2008 | Inahara | | |

(Continued)

*Primary Examiner* — Kristen C Hayes
(74) *Attorney, Agent, or Firm* — Eric E. DeMaster

(57) ABSTRACT

A dog wash and method for simultaneously washing multiple sides of a dog is disclosed. The dog wash comprises a spray assembly slideably attached to rails of a track assembly. One or more nozzle assemblies are positioned along the uptubes and spanner bar of the spray assembly to deliver water to the top and side surfaces of the dog at the same time.

20 Claims, 4 Drawing Sheets

(56) References Cited

U.S. PATENT DOCUMENTS

| | | | | |
|---|---|---|---|---|
| 7,849,850 B2* | 12/2010 | Atterbury | ............ | A61M 15/02 |
| | | | | 128/200.14 |
| 8,074,897 B2* | 12/2011 | Hunnicutt | ................ | B05B 3/003 |
| | | | | 239/204 |
| 8,191,799 B2* | 6/2012 | Chen | ......................... | B05B 1/18 |
| | | | | 239/428.5 |
| 8,276,546 B2* | 10/2012 | Makarian | ............ | A01K 13/001 |
| | | | | 119/671 |
| 8,573,509 B2* | 11/2013 | Cole | ..................... | F16L 15/006 |
| | | | | 239/203 |
| 8,733,675 B2* | 5/2014 | Leber | ........................ | B05B 1/18 |
| | | | | 239/436 |
| 8,814,531 B2* | 8/2014 | Raasch | ...................... | F04F 5/00 |
| | | | | 417/159 |
| 9,216,424 B2* | 12/2015 | Kennedy | ................... | B05B 1/18 |
| 9,216,432 B2* | 12/2015 | Lea | ....................... | E03C 1/0408 |

* cited by examiner

MULTI-SIDE DOG WASH AND METHOD OF USE

This application claim priority to U.S. Provisional Application Ser. No. 61/952,237 filed Mar. 13, 2014, the contents of which are hereby incorporated by reference.

BACKGROUND

Conventional dog washes are only capable of washing one side of a dog at a time. This is inconvenient because it requires having to reach each side of the dog with a hose or sprayer. Many dogs do not like baths and having to wash one side of the dog at a time is tiring and time consuming. A dog wash capable of washing multiple sides of the dog at once is desirable.

SUMMARY

A dog wash for simultaneously washing multiple sides of a dog is disclosed. The dog wash comprises a spray assembly slideably attached to rails of a track assembly. The spray assembly comprises a spanner tube; a first uptube having a first and second end and an oppositely disposed second uptube having a first and second end. The first end of the first uptube is slideably attached to a first rail of the track assembly and the first end of the second uptube is slideably attached to an oppositely disposed second rail of the track assembly. The second end of the first uptube and second end of the second uptube is in fluid connection with the spanner tube to form a fluid circuit, the spanner tub separating the first and second uptubes. At least one nozzle assembly is positioned along each of the uptubes and the spanner tube. The nozzle assembly comprises at least one nozzle. The spray assembly also includes a valve for controlling water flow through the fluid circuit of the spray assembly.

A dog is placed is placed between the rails of the track assembly and water is provided to the spray assembly by the valve. The nozzle assemblies are positioned along the uptubes and spanner bar of the spray assembly to deliver water to multiple surfaces of the dog. With the dog placed between the rails, the operator slides the spray assembly back and forth on the rails of the track assembly and the nozzles deliver water to the top, bottom, and sides of the dog at the same time. All the surfaces of the dog can be washed with several passes of the spray assembly along the body of the dog.

DETAILED DESCRIPTION

Figure 1:
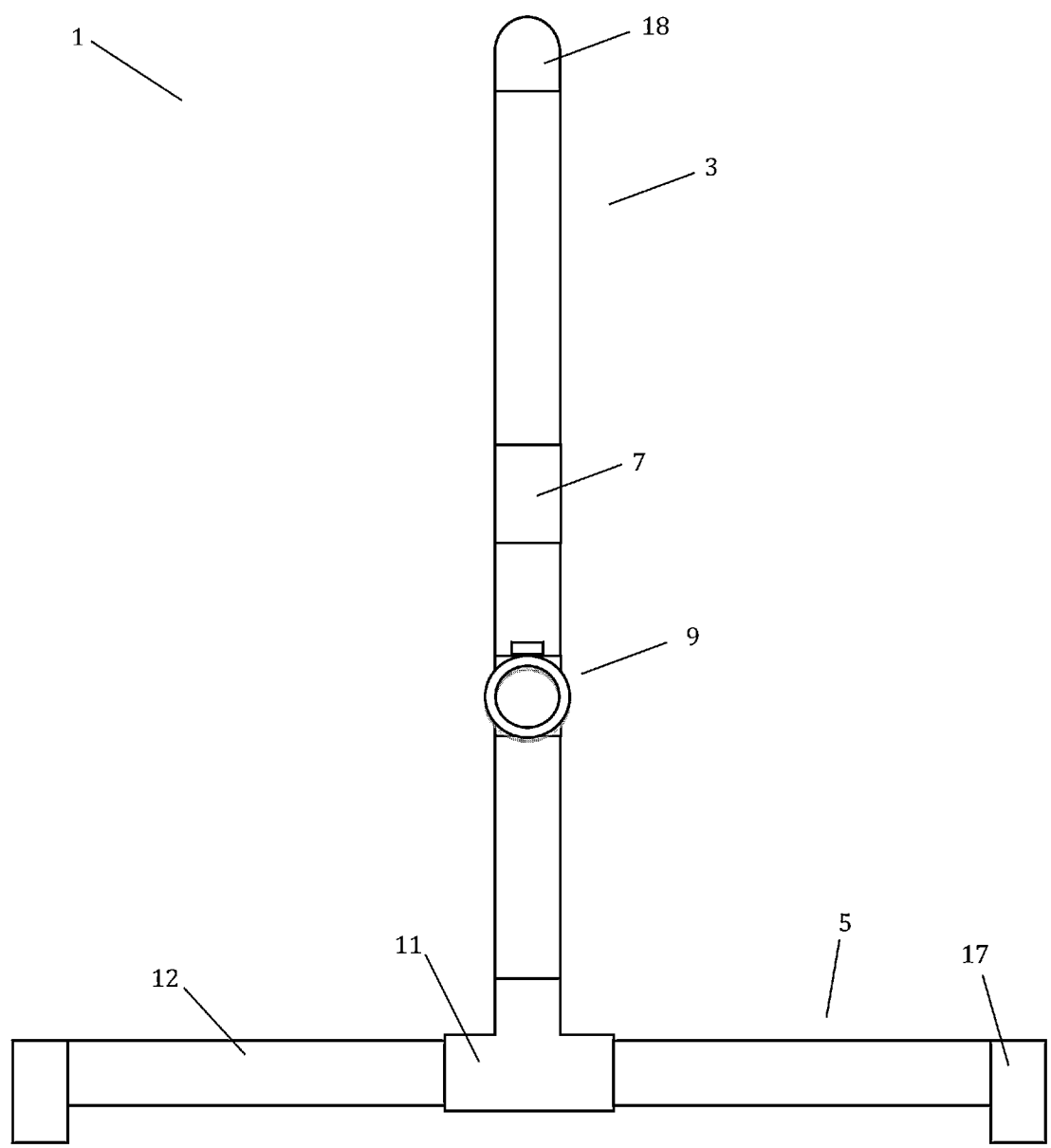
FIG. 1 shows a side view of one embodiment of a multi-side dog wash of the disclosure.

The dog wash of the disclosure is capable of washing the top, bottom, and sides of a dog at the same time. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The dog wash of the disclosure comprises a spray assembly slideably attached to rails of a track assembly. The spray assembly comprises a spanner tube; a first uptube having a first and second end and an oppositely disposed second uptube having a first and second end. The first end of the first uptube is slideably attached to a first rail of the track assembly and the first end of the second uptube is slideably attached to an oppositely disposed second rail of the track assembly. The second end of the first uptube and second end of the second uptube is in fluid connection with the spanner tube to form a fluid circuit, the spanner tub separating the first and second uptubes. At least one nozzle assembly is positioned along each of the uptubes and the spanner tube. The nozzle assembly comprises at least one nozzle. The spray assembly also includes a valve for controlling water flow through the fluid circuit of the spray assembly.

An exemplary embodiment of the dog wash of the disclosure is shown in FIG. 1. Referring to FIG. 1, the dog wash 1 includes a spray assembly 3 slideably attached to a track assembly 5. The spray assembly 3 can be constructed from pipe and one or more pipe fittings and includes multiple nozzle assemblies 7 and a valve 9 for controlling the flow of water from a water source, such as a hose, connected to the valve 9. The pipe and/or pipe fittings can be formed from any suitable material, such as metal, including but not limited to iron, steel, aluminum, copper, and alloys thereof, and plastic or composite materials. In an embodiment, the spray assembly 3 is constructed from a contiguous length of pipe that is molded and/or bent to form the shape of the assembly. In an embodiment, the spray assembly 3 can be constructed from pipe and one or more pipe fittings, such as PVC pipe and PVC pipe fittings or PEX pipe and PEX pipe fittings. In an embodiment, the PVC pipe or PEX pipe comprises an inside diameter of about 0.25 inch to about 1 inch. In an embodiment, the PVC pipe or PEX pipe comprises an inside diameter of about 0.5 inch to about 0.75 inch. The spray assembly 3 includes a T-fitting 11 that allows for the spray assembly 3 to slide back and forth on a rail 12 of the track assembly 5. In an embodiment, the spray assembly 3 is detachable from the rails 12 of the track assembly 5.

Figure 2:
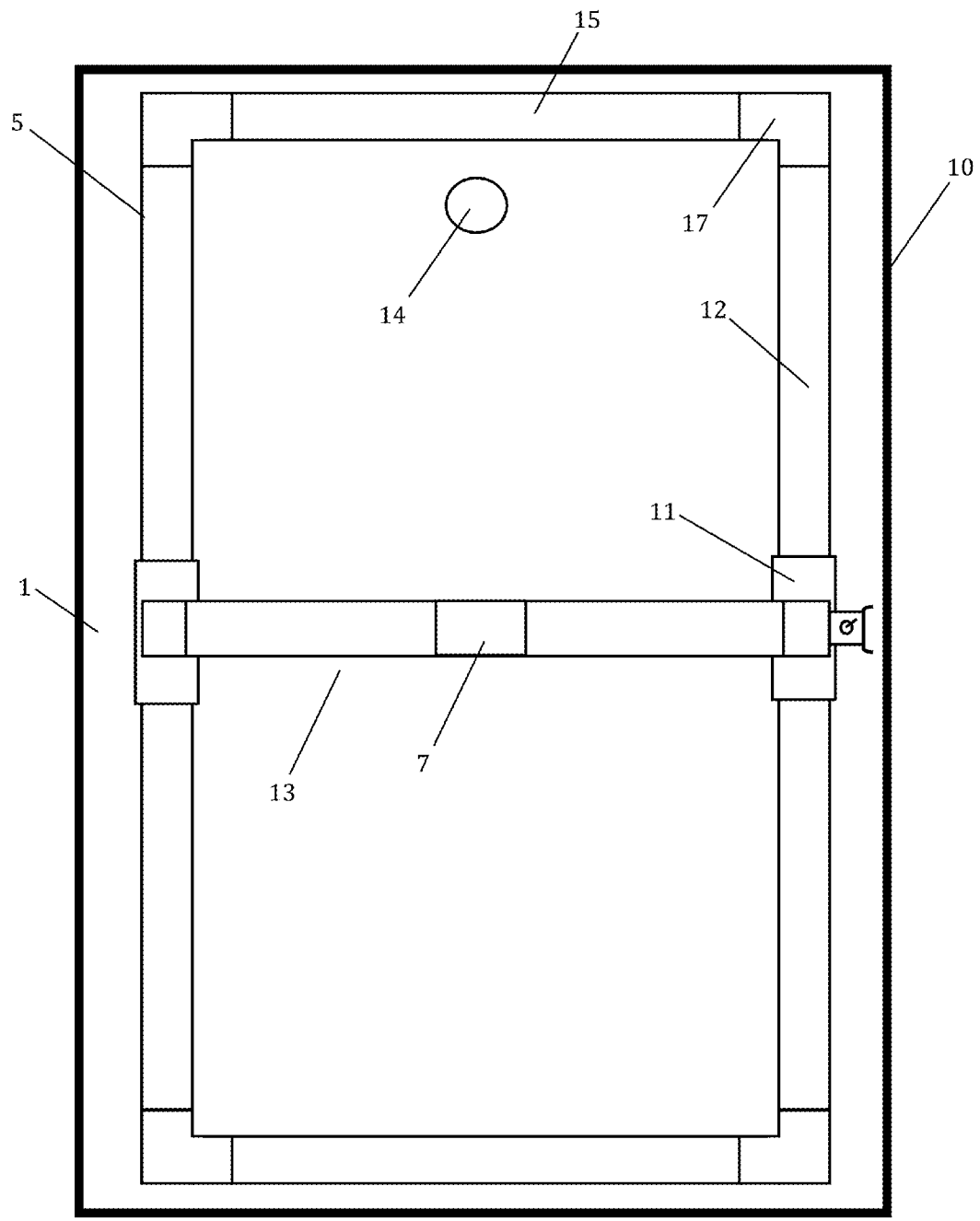
FIG. 2 shows a top view of one embodiment of a multi-side dog wash of the disclosure.

Referring to FIG. 2, the spray assembly includes a spanner tube 13. The spanner tube 13 includes at least one nozzle assembly 7. The track assembly 5 is constructed from pipe and pipe fittings, such as PVC pipe and PVC fittings or PEX pipe and PEX fittings, and includes a track support bar 15 that maintains even spacing of the rails 12 so that the T-fitting 11 of the spray assembly 3 easily slides back and forth on the rails. The track support bar 15 is connected to the rails 12 with an elbow fitting 17. The dog wash 1 can be placed in a tub 10. The tub can optionally include a drain 14. The dimensions of the track assembly 15 can be adapted to fit the dimensions of the tub 10.

Figure 3:
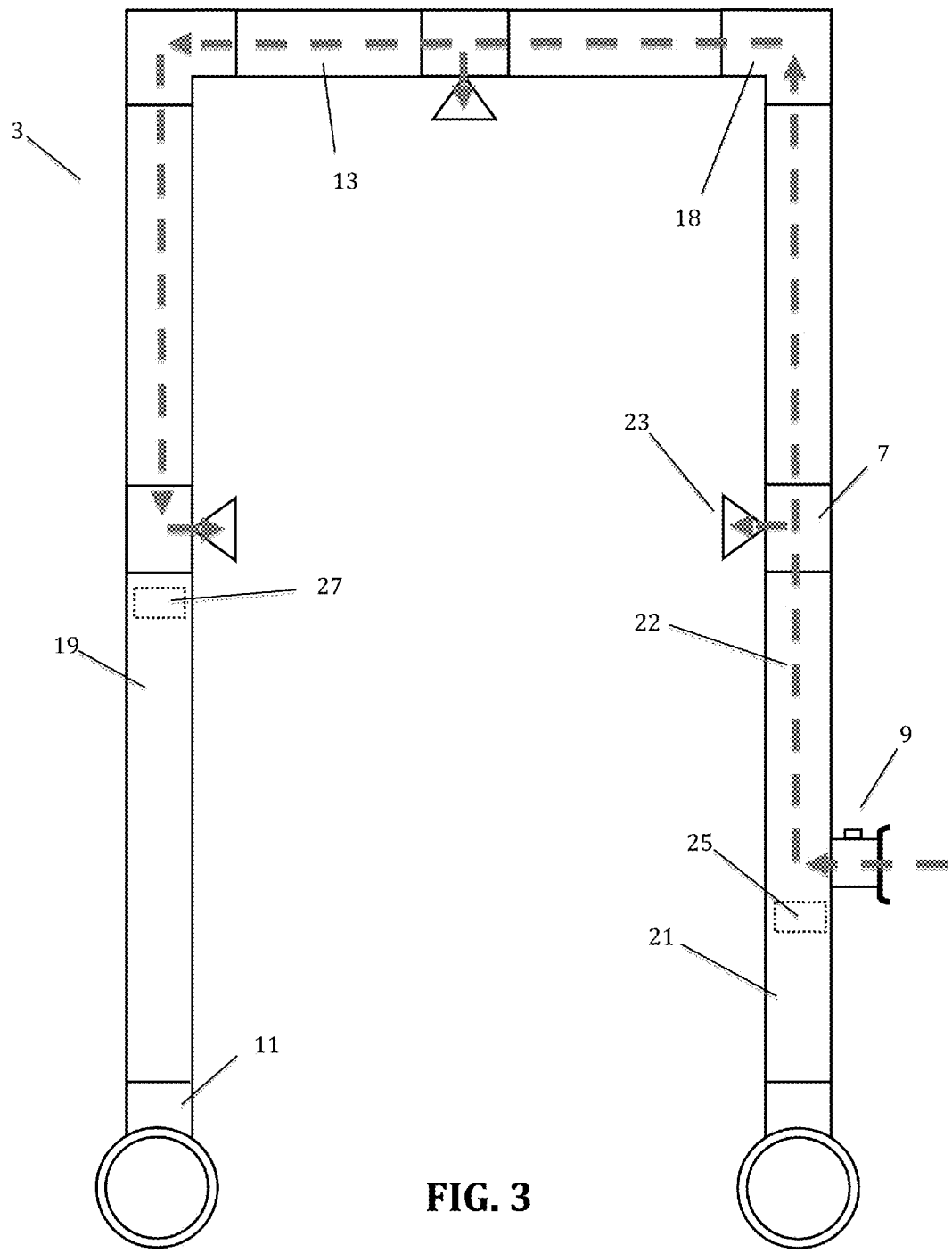
FIG. 3 shows a front view of one embodiment of a spray assembly of a multi-side dog wash of the disclosure.

Referring to FIG. 3, the spray assembly 3 includes a first uptube 19 and an oppositely disposed second uptube 21 separated by the spanner tube 13. The first and second uptubes 19, 21 are connected to the spanner tube 13 by elbow fittings 18 to form a fluid circuit 22 for the water. In some embodiments, the length of the spanner tube 13 can be adjustable so that the width of the spray assembly can be adjusted based on the size of the dog. In an embodiment, the spanner tube 13 comprises a length of about 18 inches to about 48 inches. In another embodiment, the spanner tube 13 comprises a length of about 18 inches to about 36 inches. The length of the uptubes can be adjusted based on the standing height and/or sitting height of the dog to account for dogs of multiple sizes. In an embodiment, the first and second uptubes comprise a length of about 24 inches to about 60 inches. In another embodiment, the first and second uptubes comprise a length of about 24 inches to about 48 inches. In yet another embodiment, the length of the first and second uptubes is adjustable and can be adjusted as necessary to accommodate dogs of different standing height and/or sitting height.

Each uptube 19, 21 and the spanner bar 13 includes at least one nozzle assembly 7. In an embodiment, the spanner tube 13 includes from 1 to 10 nozzle assemblies spaced along the length of the spanner tube 13. In another embodiment, the spanner tube 13 includes from 1 to 5 nozzle assemblies spaced along the length of the spanner tube 13. In yet another embodiment, the spanner tube 13 includes from 1 to 3 nozzle assemblies spaced along the length of the spanner tube 13. In an embodiment, the uptubes 19, 21 include from 1 to 10 nozzle assemblies spaced along the length of each uptube. In another embodiment, the uptubes 19, 21 include from 1 to 5 nozzle assemblies spaced along the length of each uptube. In yet another embodiment, the uptubes 19, 21 include from 1 to 3 nozzle assemblies spaced along the length of each uptube. In some embodiments, the uptubes 19, 21 include one or more molded in fittings capable of accepting a nozzle 23 or nozzle assembly 7. In some embodiments, the nozzle 23 or nozzle assembly 7 is capable of screwing directly into a sidewall of the uptubes 19, 21.

In an embodiment, the nozzle assembly 7 comprises a T-fitting. The T-fitting is capable of accepting a nozzle 23. Preferably the direction of spray of the nozzle is adjustable such that the nozzle can be adjusted to spray a stream of water on a desired surface of the dog. In embodiments, the T-fitting can be a PVC fitting or PEX fitting. In an embodiment, the T-fitting can include a threaded end capable of accepting a screw-in type nozzle.

The nozzle 23 can be any type of nozzle suitable for use with water. The nozzle 23 can be a screen-in type nozzle, pressure fit nozzle, snap fit, nozzle, or quick connect type nozzle. The nozzle 23 can be formed from any suitable material, including but not limit to metal, plastic, and composite materials. The nozzle 23 can have an adjustable flow rate and/or an adjustable spray pattern. In an embodiment, the nozzle 23 comprises a fixed spray pattern. In an embodiment, the nozzle 23 comprises an adjustable spray pattern. The spray pattern can include a fan, a stream, a shower, a mist, or a combination thereof.

Figure 4:
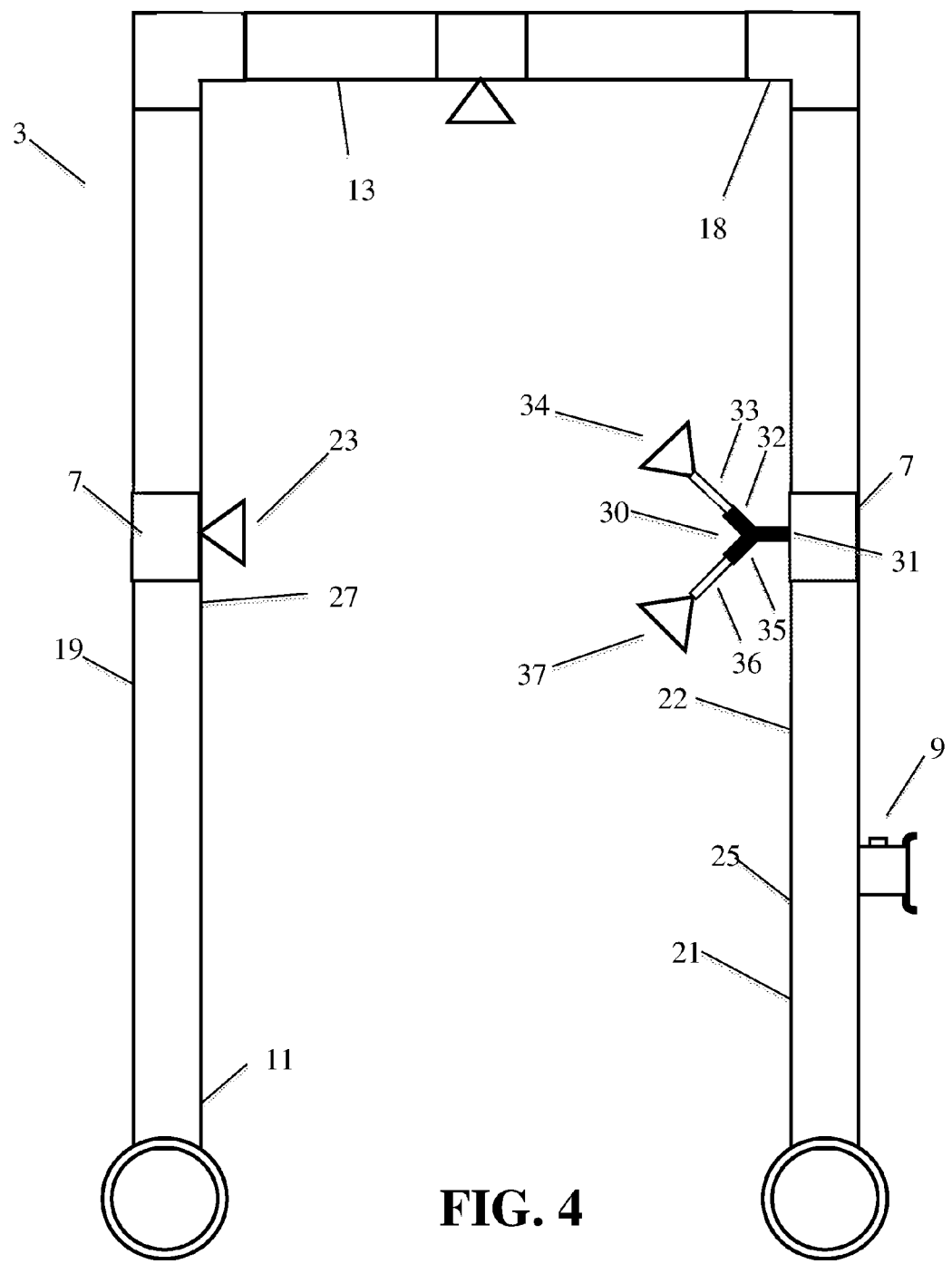
FIG. 4 shows a front view of another embodiment of a spray assembly of a multi-side dog wash of the disclosure.

In an embodiment, the nozzle comprises a Loc-Line nozzle or sprayer. In an embodiment, the nozzle assembly 7 comprises a Y-connector capable of accepting two modular hoses, such as a Loc-Line hose, each hose having a nozzle. In an embodiment shown in FIG. 4, the nozzle assembly 7 comprises a Y-connector 30, wherein a first end of the Y-connector 31 is connected to and in fluid communication with the uptube or spanner tube, a second end of the Y-connector 32 is connected to and in fluid communication with a first length of modular hose 33 comprising a first nozzle 34, and a third end of the Y-connector 35 is connected to and in fluid communication with a second length of modular hose 36 comprising a second nozzle 37. In an embodiment, the modular hose is 0.5 inch to 0.75 inch modular hose.

One of the uptubes includes the valve 9 in fluid communication with the uptube. In an embodiment, the valve 9 is positioned below the nozzle assembly 7. A first stopper, plug, or cap element 25 is inserted into the uptube below the valve 9 to define a first end of the fluid circuit 22. A second stopper, plug, or cap element 27 is inserted into the oppositely disposed uptube below the nozzle assembly 7 to form the second end of the fluid circuit 22.

A dog is placed is placed between the rails 12 of the track assembly 5 and water is provided to the spray assembly 3 by the valve 9. The nozzle assemblies 7 are positioned along the uptubes 19, 21 and spanner bar 13 of the spray assembly 3 to deliver water to top and side surfaces of the dog. With the dog placed between the rails 12, the operator slides the spray assembly 3 back and forth on the rails 12 and the nozzles 23 deliver water to the top, bottom, and sides of the dog at the same time. All the surfaces of the dog can be washed with several passes of the spray assembly 3 along the body of the dog.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A dog wash for simultaneously washing multiple sides of a dog, comprising a spray assembly slideably attached to rails of a track assembly, the spray assembly comprising:
   a spanner tube comprising a length of about 18 inches to about 48 inches;
   a first uptube having a first and second end and an oppositely disposed second uptube having a first and second end wherein the first and second uptubes comprise a length of about 24 inches to about 60 inches, the first end of the first uptube slideably attached to a first rail of the track assembly and the first end of the second uptube slideably attached to an oppositely disposed second rail of the track assembly, wherein the second end of the first uptube and second end of the second uptube is in fluid connection with the spanner tube to form a fluid circuit, the spanner tube separating the first and second uptubes;
   at least one nozzle assembly positioned along each of the uptubes and the spanner tube, the nozzle assembly comprising at least one nozzle; and
   a valve for controlling water flow through the fluid circuit of the spray assembly;
   wherein a length of the first and second uptubes is adjustable so that the height of the spanner tube can be adjusted based on the standing height and/or sitting height of the dog.

2. The dog wash of claim 1, further comprising a tub wherein the track assembly is positioned within the tub.

3. The dog wash of claim 1, wherein the spray assembly is detachable from the rails of the track assembly.

4. The dog wash of claim 1, wherein the nozzle assembly comprises a screw-in nozzle.

5. The dog wash of claim 1, wherein the nozzle comprises an adjustable spray pattern.

6. The dog wash of claim 5, wherein the spray pattern is a fan.

7. The dog wash of claim 5, wherein the spray pattern is a stream.

8. The dog wash of claim 5, wherein the spray pattern is a shower.

9. The dog wash of claim 5, wherein the spray pattern is a mist.

10. The dog wash of claim 1, wherein the nozzle assembly comprises a Y-connector, wherein a first end of the Y-connector is connected to and in fluid communication with the uptube or spanner tube, a second end of the Y-connector is connected to and in fluid communication with a first length of modular hose comprising a first nozzle, and a third end of the Y-connector is connected to and in fluid communication with a second length of modular hose comprising a second nozzle.

11. The dog wash of claim 10, wherein the modular hose is loc-line hose.

12. The dog wash of claim 1, wherein the first and second uptubes and spanner tube comprise PVC pipe or PEX pipe.

13. The dog wash of claim 12, wherein the PVC pipe or PEX pipe comprises an inside diameter of about 0.25 inch to about 1 inch.

14. The dog wash of claim 1, wherein the first and second uptubes comprise a length of about 24 inches to about 48 inches.

15. The dog wash of claim 1, wherein the nozzle or nozzle assembly has an adjustable flow rate.

16. The dog wash of claim 1, wherein the nozzle assembly comprises a pressure fit nozzle.

17. The dog wash of claim 1, wherein the nozzle assembly comprises a snap fit nozzle.

18. The dog wash of claim 1, wherein the nozzle assembly comprises a quick connect nozzle.

19. A method of washing a dog using the dog wash of claim 1, comprising:

placing a dog between the rails of the track assembly;

providing water to the spray assembly; and sliding the spray assembly on the rails to deliver water to the top, bottom, and sides of the dog at the same time.

20. The dog wash of claim 1, wherein the first and second uptubes comprise from 1 to 10 nozzles spaced along the length of each uptube.

* * * * *